United States Patent Office 3,455,424
Patented July 15, 1969

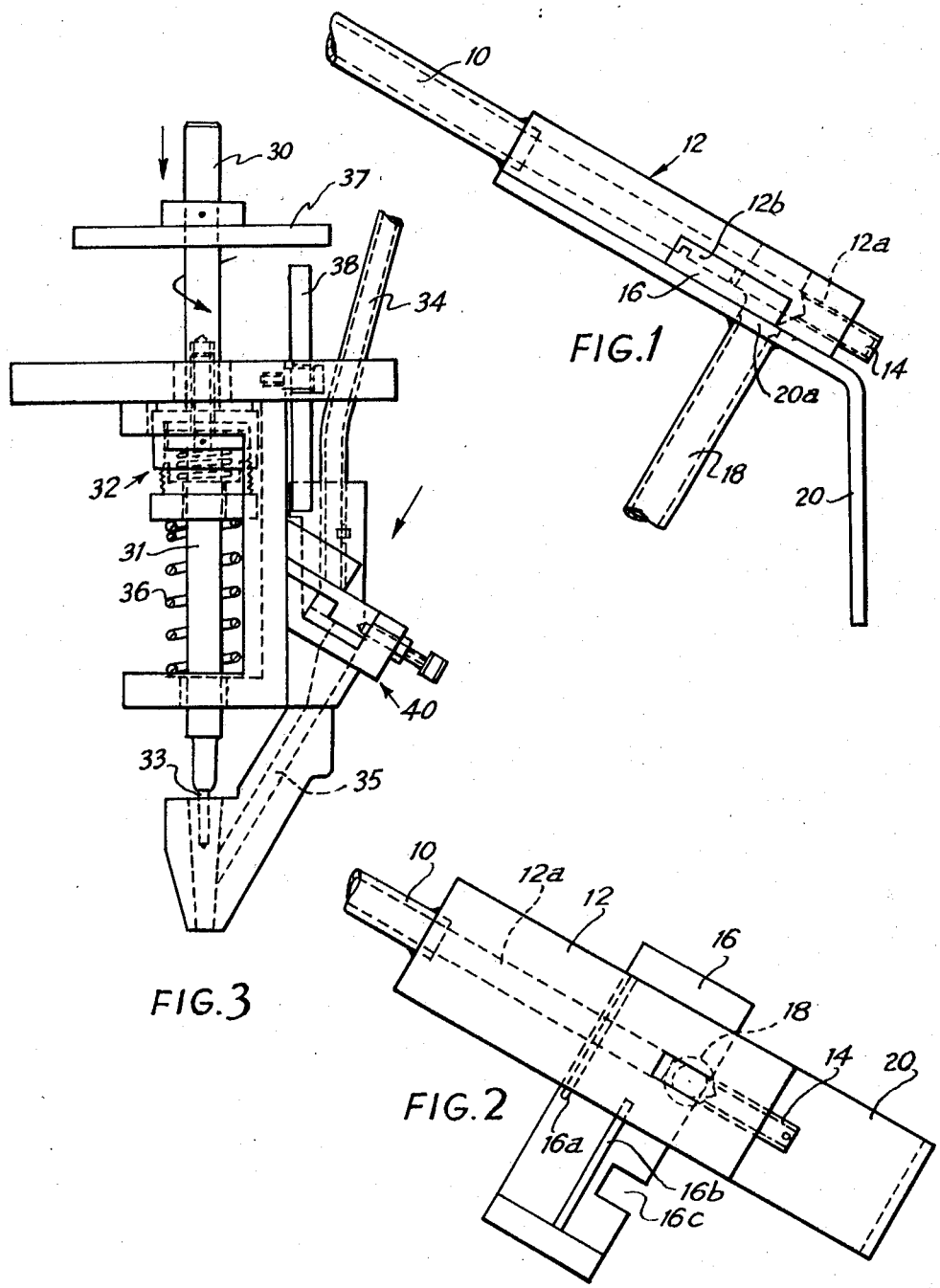

3,455,424
ORIENTING APPARATUS
Peter Martin Bell, Stockport, England, assignor to Koevac-Bell Limited, Northern Ireland and the Isle of Man, a corporation of the United Kingdom of Great Britain
Filed Nov. 13, 1967, Ser. No. 682,259
Claims priority, application Great Britain, Nov. 11, 1966, 50,601/66
Int. Cl. B65g 11/20
U.S. Cl. 193—43                8 Claims

ABSTRACT OF THE DISCLOSURE

There is disclosed a structure for orienting longitudinally unsymmetrical objects comprising an abutment in a guide means cooperating with a laterally reciprocating slide means to meter and orient said objects so that all of the said objects are oriented the same way.

---

This invention concerns apparatus for orienting longitudinally unsymmetrically shaped objects such as ground point drill blanks, grub screws with slotted or socket heads, and certain unsymmetrically shaped pins or rivets.

The object of the invention is to provide such apparatus which is simple in nature and therefore not expensive, and which is efficient and rapid in operation.

According to the present invention apparatus for orienting longitudinally unsymmetrical shaped objects comprises guide means by way of which the objects may pass or be passed in the direction of their longitudinal axes in random orientation until they contact, with their leading ends, an abutment which is so sensitive to their unsymmetrical shape that each object will stop on contact in one of two longitudinal positions according to which end leads, a slide adapted to be reciprocated transversely of such guide means and so formed as then to meter said objects one by one to said abutment and to release each object after contact with the latter and cause it to pivot one way or the other depending upon its position so that the same end always leads and all the objects are oriented the same way, and further guide means for conveying the oriented objects away.

The invention will now be described further, by way of example only, with reference to the several figures of the accompanying drawings, in which:

FIG. 1 is a side elevation of apparatus for orienting cylindrical components having one pointed end and one flat end;

FIG. 2 is a plan view of the apparatus of FIG. 1; and

FIG. 3 is a side elevation of a power operable screwdriver including orienting apparatus similar to that of FIGS. 1 and 2.

Referring firstly to FIGS. 1 and 2, it will be seen that the apparatus basically comprises an inlet tube 10, a guide 12, an adjustable abutment 14, a gate 16, an outlet tube 18 and a support 20.

The support 20 is in the form of a simple bracket the angularity of which establishes the disposition of the apparatus. In FIG. 1, it will be seen that the support 20 holds the apparatus at about 30° from the horizontal to facilitate gravity feed of the components to be sorted as will later be apparent.

The inlet tube 10, the guide 12, the outlet tube 18 and the support 20 are securely welded or screwed together in such a manner that the bore of the inlet tube 10 is in line with and connects with a cylindrical bore 12a in the guide 12, whilst the bore of the outlet tube 18 registers with an aperture 20a in the support 20, the axis of which in turn intersects at right angles with the bore 12a in the guide 12.

Transversely of the guide 12 is a channel 12b closed by the support 20, intersecting with the lower half of the bore 12a and just bringing within its compass the aperture 20a in the support 20.

The adjustable abutment 14 is in the form of a threaded member screwed into a tapped bore 12c in the guide 12 which is aligned with the bore 12a. The inner end of the abutment 14 is of inwardly directed conical shape to receive the point, if leading, of an oncoming component. Slidably located transversely of the channel 12b is a gate 16. This serves to meter components coming down the bore 12a of the guide 12 one-at-a-time to the abutment 14, by virtue of retaining and release bars 16a and 16b. It also has a cutout 16c which at one extreme position only of the gate 16 allows passage of a component to the outlet tube 18.

The apparatus functions as follows. Components are fed by gravity, randomly as far as lengthwise orientation is concerned, to the guide 12 via the inlet tube 10. The gate 16 is continuously reciprocated to meter components one-by-one by the action of the bars 16a and 16b. In the position of the gate 16 shown in FIG. 2 the bar 16a will be supporting the oncoming column of components whilst the bar 16b will just have released the leading component to the abutment 14. If the pointed end is leading, the component will come to rest in a more advanced position than if the blank end were leading, by virtue of the pointed end entering the shaped end of the abutment 14. As the gate 16 then moves across the channel 12b the bar 16a releases the column of components to the bar 16b and as the cutout 16c registers with outlet tube 18 the component falls away into the tube. However, the manner in which it falls depends on its longitudinal orientation in the slide 12. If the pointed end is leading then the slightly advanced disposition referred to causes it to pivot about the lower part of the aperture 20a in the support 20 so that the blank end leads as it falls into the outlet tube 20. If the blank end leads, then, because it is not so advanced, it pivots about the bottom of the cutout 16c so that, again, the blank end leads as it falls into the outlet tube 18.

It will be appreciated that the adjustable abutment 14 may be provided with an inner end surface of any suitable configuration depending upon the type of screw to be sensed.

When a grub screw having a slotted end is to be sensed the abutment is provided with an eccentric projecting pin adapted to engage the slot. The action of reciprocating the gate 16 causes the grub screw being sensed to rotate about its longitudinal axis ensuring that the pin comes into register with the slot even if the latter is not diametrically disposed, as might often be the case.

The device is simple and inexpensive, and furthermore, is very rapid and accurate in operation.

The apparatus has many applications amongst which may be cited for example the feed of screws to a power operable screwdriver.

Thus as shown in FIG. 3 a power operated screwdriver essentially comprises an input shaft 30 connected to an output shaft 31 via an adjustable torque clutch generally indicated at 32. The output shaft 31 carries a screwdriver bit 33 on its lower end.

Secured to the screwdriver assembly is orienting apparatus 40 essentially similar to that described with reference to FIGS. 1 and 2 but having somewhat modified geometry in that the input and output tubes 34 and 35 respectively extend substantially in the same direction.

In use, when the shafts 30 and 31 are moved downwardly for an operative stroke against the action of return compression spring 36 a disc 37 secured to the input shaft 30 engages a lever 38 which in turn actuates the slide of the orienting apparatus 40 to feed a screw, properly oriented down the output tube 35 to a position to be operatively engaged by the bit 33. It will be understood that the input tube 34 is supplied with screws from for example a vibratory bowl feeder.

It will be appreciated that it is not intended to limit the invention to the above examples only, many variations, such as might readily occur to one skilled in the art being possible, without departing from the scope thereof as defined by the appended claims.

What is claimed is:

1. Apparatus for orienting longitudinally unsymmetrical shaped objects comprising guide means by way of which the objects may pass or be passed in the direction of their longitudinal axes in random orientation until they contact, with their leading ends, an abutment which is so sensitive to their unsymmetrical shape that each object will stop on contact in one of two longitudinal positions according to which end leads, a slide adapted to be reciprocated transversely of such guide means and so formed as then to meter said objects one by one to said abutment and to release each object after contact with the latter and cause it to pivot one way through a first angle or the other through a second angle depending upon its position so that the same end always leads and all the objects are oriented the same way, the sum of said first angle and said second angle being substantially 180°, further guide means for conveying the oriented objects away, said slide comprising a baseplate having two spaced parallel bars mounted on the upper face thereof and extending transversely from opposite sides thereof, and being of such lengths that as the slide is reciprocated the objects are metered one by one to the abutment.

2. Apparatus according to claim 1, wherein said slide comprises a baseplate having two spaced parallel bars mounted on the upper face thereof and extending transversely from opposite sides thereof, and being of such lengths that as the slide is reciprocated the objects are metered one by one to the abutment.

3. Apparatus according to claim 2, wherein said slide has a cutaway portion at its edge adjacent said abutment which cutaway portion comes into register with the entrance to said further guide means for conveying the oriented objects away at one position of the slide.

4. Apparatus according to claim 3, wherein said objects can pivot depending upon their axial ends when in engagement with the abutment either about the rear edge of said cutaway portion or about the entrance to said further guide means for conveying the oriented objects away from this said abutment.

5. Apparatus according to claim 1 wherein said slide contacts the sides of said objects, the reciprocation of said silde causing axial rotation of said objects.

6. Apparatus according to claim 5 wherein said slide comprises a baseplate having two spaced parallel bars mounted on the upper face thereof and extending transversely from opposite sides thereof, and being of such lengths that as the slide is reciprocated the objects are metered one by one to the abutment.

7. Apparatus according to claim 6 wherein said slide has a cutaway portion at its edge adjacent said abutment which cutaway portion comes into register with the entrance to said further guide means for conveying the oriented objects away at one position of the slide.

8. Apparatus according to claim 7 wherein said objects can pivot depending upon their axial ends when in engagement with the abutment either about the rear edge of said cutaway portion or about the entrance to said further guide means for conveying the oriented objects away from this said abutment.

References Cited

UNITED STATES PATENTS 2,572,312  10/1951  Burge et al.
3,212,668  10/1965  Gleason et al.

ANDRES H. NIELSEN, Primary Examiner